United States Patent [19]
Winter et al.

[11] 3,983,275
[45] Sept. 28, 1976

[54] COOKWARE PREPARED FROM HIGH TEMPERATURE ALUMINUM BASE ALLOYS

[75] Inventors: Joseph Winter, New Haven, Conn.; William C. Setzer, Creve Coeur; Douglas L. Graham, Ballwin, both of Mo.; Michael J. Pryor, Woodbridge, Conn.

[73] Assignee: Swiss Aluminium Ltd., Chippis, Switzerland

[22] Filed: May 2, 1975

[21] Appl. No.: 573,954

Related U.S. Application Data

[60] Continuation-in-part of Ser. No. 492,444, July 29, 1974, abandoned, which is a division of Ser. No. 351,640, April 16, 1973, abandoned.

[52] U.S. Cl. ........................ 428/35; 220/64; 428/141; 428/156; 428/206; 428/422; 428/429; 428/432; 428/435; 428/469
[51] Int. Cl.² ............... A47J 36/02; B32B 15/04; B32B 15/20
[58] Field of Search .............. 126/390; 220/64; 75/138; 428/141, 156, 35, 206, 208, 421, 422, 429, 433, 435, 471, 472, 432, 469

[56] References Cited
UNITED STATES PATENTS

| | | | |
|---|---|---|---|
| 3,206,848 | 9/1965 | Rentmeester | 220/64 |
| 3,334,781 | 8/1967 | Kraus | 220/64 |
| 3,386,820 | 6/1968 | Jagaciak | 75/138 |
| 3,393,086 | 7/1968 | Keating | 220/64 |
| 3,419,414 | 12/1968 | Marks | 428/141 |
| 3,788,513 | 1/1974 | Racz | 428/156 |

*Primary Examiner*—Harold Ansher
*Assistant Examiner*—Charles E. Lipsey
*Attorney, Agent, or Firm*—David A. Jackson; Robert H. Bachman

[57] ABSTRACT

A cooking utensil formed from a high temperature aluminum base alloy component exhibiting favorable formability, said aluminum base alloy component comprising from about 0.1–0.7% zirconium, 0.1–0.4% chromium, 0.3–1.5% manganese, and the balance essentially aluminum and having at least a first and a second major surface, said second major surface being in opposing relationship to said first major surface; a glass or ceramic first covering from about 40 to 100% of the surface area of said first major surface, said glass or ceramic being bonded to said aluminum base alloy component; and a heat resistant organic resin coating over said glass or ceramic component and said first major surface of said aluminum base alloy component.

7 Claims, 3 Drawing Figures

COOKWARE PREPARED FROM HIGH TEMPERATURE ALUMINUM BASE ALLOYS

CROSS REFERENCE TO RELATED APPLICATIONS

The present application is a Continuation-In-Part of application Ser. No. 492,444, filed on July 29, 1974, which is in turn, a Division of application Ser. No. 351,640, filed Apr. 16, 1973, both now abandoned.

BACKGROUND OF THE INVENTION

For many years, it has been known to employ composites comprising a heat resistant organic resin coating on a metal base, such as aluminum and stainless steel for cooking utensils. Pots and pans and other cooking utensils employing this composite enjoy non-sticking properties due to the resin coating which make them very easy to clean.

An improved composite for such use has also been employed wherein a glass or ceramic frit is bonded to the metal base over a portion of its surface area and then the glass frit and metal base are coated with the organic resin. This composite when used for cooking utensils provides the added improvement of rendering the organic resin coating wear resistant.

The aluminum alloy generally used for this purpose is the low magnesium Alloy AA 3003, which has a composition of up to 0.6% silicon, up to 0.7% iron, from 0.05 to 0.20% copper, from 1.0 to 1.5% manganese, balance essentially aluminum. However, this alloy has not been entirely satisfactory. Only simple shapes can be enameled because of distortion during this operation which is carried out at 1000°F and takes about 15 minutes. The distortion generally occurs in the portion of the sidewall which is cold worked and reduced in gage during the drawing operation. An additional problem with Alloy 3003 is that after it is enameled, the material is fully annealed and very soft. Hence, it is susceptible to denting damage, crazing, chipping and spalling of the ceramic. In addition to the foregoing, the sidewall of an article such as a pot must have sufficient flexural strength when loaded so that when lifted by the handle it does not collapse. In order to comply with this requirement, Alloy 3003 must be either made thicker or cold worked in some way in order to increase the yield strength.

The above problem has been noted in the prior art as reported by U.S. Pat. No. 3,788,513, to Racz. Patentee notes that the preparation of procelain coated cookware from aluminum suffers from the thermal stability for high purity aluminum at porcelainizing temperatures, with the results that such material had to be employed in increased thicknesses to compensate for loss of strength. Further, patentee notes that certain aluminum alloys which exhibit favorable thermal properties in that they age-harden to acceptable strength levels after exposure to porcelainizing temperature levels, are nonetheless unacceptable in cookware applications as they contain quantities of magnesium which renders them incompatible with procelain enamels. From the above it may be concluded that an acceptable aluminum alloy for use in cookware applications should be one that is compatible with porcelain enamel and capable of retaining its strength subsequent to exposure to porcelainizing temperature. In other words, a suitable aluminum alloy would have to be a non-magnesium containing high temperature aluminum material.

In the above context, the art suggests very few materials meeting the above criteria of high temperature stability and reduced or non-existent magnesium content. Of the alloys listed and registered with the Aluminum Association, only one alloy, namely, Alloy 2219, possesses the requisite properties to meet the aforenoted criteria. This alloy is a known high temperature alloy whose primary utility resides in such applications as rocket nose cones and the like, and which possesses a magnesium content ranging up to a maximum of 0.02% by weight. Another aluminum base alloy possessing high temperature stability which contains no magnesium is disclosed in U.S. Pat. No. 3,386,820, to Jagaciak, assigned to the assignees of the present application.

Though the selection of either of the above alloys would appear theoretically correct, an additional characteristic unexpectedly found to be possessed by one of the alloys renders it alone suitable in cookware applications. This characteristic, referred to hereinafter as formability, relates to the ability of the alloy to undergo the deformation required to prepare articles such as pots and pans. As will be seen hereinafter, this property has not been previously recognized and investigated.

It is, therefore, highly desirable to provide a replacement alloy which overcomes this disadvantage, while still meeting the stringent requirements for this difficult composite. For example, a replacement alloy for use in this composite would have to retain the procelain enameling and the resin coating capability of AA 3003 and provide increased room temperature strength after exposure to the thermal treatment, while overcoming the aforenoted disadvantage and withstanding distortion during enameling. A further requirement is that the aluminum alloy must have sufficient formability to make the desired configuration and do so with minimum earing. An additional requirement is a fine grain size before forming since a coarse grain results in the esthetically objectionable phenomenon known as "orange peel".

SUMMARY OF THE INVENTION

In accordance with the present invention, improved articles of cookware are prepared from a high temperature aluminum alloy metal base possessing desirable formability and containing zirconium from 0.1–0.7%, chromium from 0.1–0.4%, manganese from 0.3–1.5%, balance aluminum, a coating of a glass or ceramic frit bonded to and covering at least 40% of the surface area of a major surface of the metal base and a coating of a heat resistant organic resin covering the glass or ceramic frit and the major surface of the metal base.

In accordance with an alternate embodiment of the present invention, a layer of glass or ceramic frit may be bonded to the exposed surface where it is desired to obtain improved tarnish resistance and/or change the color of the exposed metal surface opposing the resin coating.

In accordance with the present invention, kitchen utensils possessing a wide variety of shapes may be readily formed, as well as non-kitchen utensils, containers, panels and so forth. Complex shapes may be readily enameled without distortion. The resulting utensils possess excellent physical properties, are readily and inexpensively prepared and have an aesthetically pleasing appearance.

In addition to its favorable formability, the metal component forms on its surface an oxide layer of $Al_2O_3$. This oxide film comprises a thickness of at least 50 Angstroms and when the glass or ceramic frit component is bonded to the metal component having the $Al_2O_3$ film thereon, a strong bond results which provides a considerable degree of wear resistance in the final resin coated composite.

Accordingly, it is a principal object of the present invention to provide improved cooking utensils comprising a metal base prepared from an aluminum base alloy possessing a combination of thermal stability and formability, a glass or ceramic frit component coated over at least a portion of the surface area of a major surface of the metal base and firmly bonded to the metal base and a heat resistant organic resin component formed over the entire major surface of the metal base containing the glass or ceramic frit component.

It is a further object of the present invention to provide cooking utensils as aforesaid wherein said aluminum base alloy possesses sufficient formability to facilitate the preparation of complex configurations with minimum earing.

A still further object of the present invention is to provide cooking utensils as aforesaid wherein the aluminum component thereof withstands distortion during enameling while meeting the other difficult requirements for composites of this type.

An additional object of this invention is to provide a composite as aforesaid which is inexpensive and may be expeditiously prepared on a commercial scale.

Further objects and advantages of the present invention will appear from the ensuing specification.

DETAILED DESCRIPTION OF THE PREFERRED EMBODIMENTS

In accordance with the present invention, the foregoing objects and advantages are readily obtained.

Composite cooking utensils are prepared herein which comprise an aluminum base alloy component possessing a surprising combination of high temperature stability and favorable formability. Specifically, the alloys employed in the present invention are capable of resisting temperatures in excess of 1000°F such as are encountered in the porcelainizing of metallic substrates with a glass or ceramic composition, and maintain their shape and strength without sagging or otherwise deforming. These same alloys are also capable of being shaped into complex configurations by processes such as deep drawing with a surprising speed and facility and without the objectionable surface distortion and earing.

A particular feature of the present invention resides in the unexpected formability of the present alloys, noted above. The alloys are capable of deforming an amount of about 40% in excess of that obtained with a comparable high temperature, nonmagnesium alloy, in tests which will be presented hereinafter. Likewise, in tests conducted between the alloys of the present invention and conventional cookware Alloy AA 3003, the former alloys were found to possess favorably comparable drawability.

The aluminum alloys for use in the composite of the present invention contain from 0.1–0.7% zirconium and preferably from 0.2–0.4%, from 0.1–0.4% chromium and preferably from 0.2–0.3%, from 0.3–1.5% manganese and preferably from 0.5–1.3%, and the balance aluminum. In preparing these alloys commercial purity aluminum may readily be utilized. In general, the alloy may contain the following as impurity limits or additives: iron up to 0.7%, silicon up to 0.5%, copper up to 0.5%, magnesium up to 0.1% and more typically less than 0.05%, others, each up to 0.1%, total up to 0.25%. As a general rule, impurities and additives may be present in amounts not adversely affecting the properties of the alloy or the oxide film. The alloys in U.S. Pat. No. 3,386,820, previously noted, are particularly suitable.

Figure 1:
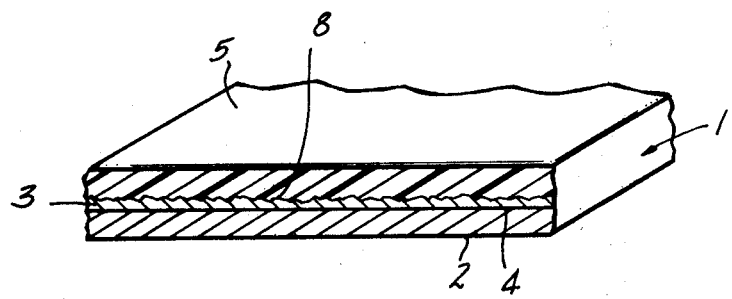
FIG. 1 shows a sectional perspective view of a composite structure useful in accordance with one embodiment of the instant invention.

Referring now to the drawings and especially to FIG. 1, there is shown a composite 1 in accordance with the instant invention. The composite 1 comprises a metal base 2 or component which is the aluminum alloy described above.

The aforenoted aluminum base alloys form on their exposed surfaces an oxide, a major component of which is $Al_2O_3$ in the form of a thin compact continuous film. The $Al_2O_3$ film forms immediately adjacent to the metal, is strongly adherent to it and has a thickness of at least 50 Angstroms. $Al_2O_3$ is the major component of the oxide film.

Alumina seals efficiently to most glasses and ceramics. Therefore, since the alumina film formed on the alloys used with this invention is tightly adherent to the alloys, an excellent glass or ceramic-to-metal bond is produced.

Any well known glass or ceramic which will readily fuse with the alumina film on the metal surface may be used as the glass or ceramic component 3 in the composite of this invention. However, the mismatch in coefficient of expansion between the metal component and the glass or ceramic should preferably be less than $110 \times 10^{-7}$ in./in./°C.

The composite of this invention that is able to tolerate a substantial mismatch in coefficient of expansion between the glass or ceramic component 3 and the metal component 2. If stronger and/or more elastic glasses or ceramics are developed even greater degrees of mismatch than above noted could be tolerated.

Table I lists exemplary glasses or ceramics which are adapted for use in accordance with this invention.

TABLE I

| GLASS OR CERAMIC TYPE | COEFFICIENT OF THERMAL EXPANSION in./in./°C |
|---|---|
| *FERRO CORPORATION No. EN-701-A (Clear Porcelain) | approximately $160 \times 10^{-7}$ |
| *FERRO CORPORATION No. CN-500-A | |

TABLE I-continued

| GLASS OR CERAMIC TYPE | COEFFICIENT OF THERMAL EXPANSION in./in./°C |
|---|---|
| *FERRO CORPORATION No. CN-600 either with or without 10% quartz No. 400 | approximately 165 × 10⁻⁷ |
| *OWENS - Illinois No. 00583 (Sealing Glass) | 117 × 10⁻⁷ |

*Proprietary Composition

It has been found that additions of 2 parts boric acid, 1.35 parts KOH, 9.3 parts potassium silicate, 0.5 parts silicic acid per 100 parts of the clear porcelain No. EN-701-A manufactured by the Ferro Corporation, Cleveland, Oh., is beneficial in accordance with this invention.

It has been found that various glasses and ceramics can be employed in this invention and the examples set forth in Table I are not meant to be limitative of the invention.

The glass or ceramic component 3 of the composite 1 of FIG. 1 comprises a coating of frit of any desired composition which covers from about 40 to 100% of the surface area of a major surface 4 of the metal component 2. In the composite 1 shown, the glass or ceramic covers the entire surface area of the major surface 4 of the metal component 2; however, in practice, it has been found that coverage of about 55 to 60% of the surface area is sufficient for most purposes.

The final component of the composite of FIG. 1 comprises a heat resistant organic resin 5 of a composition well known in the art for use in cooking utensils. For examples, the resin may be a polyimide; a polymer of a halogenated ethylene or a halogenated propylene; or a silicone. A particularly preferred material comprises polytetrafluoroethylene; however, other similar fluoro-carbons could be employed.

The aforenoted compounds comprise well known heat resistant organic resins and are meant to be exemplary of suitable resins 5 useful in accordance with this invention; however, the invention is not meant to be limited thereby. The heat resistant organic resin 5 is preferably heat curable as are the aforenoted exemplary compounds and further preferably it exhibits nonsticking qualities which make it useful as a readily cleanable cooking surface.

Figure 2:
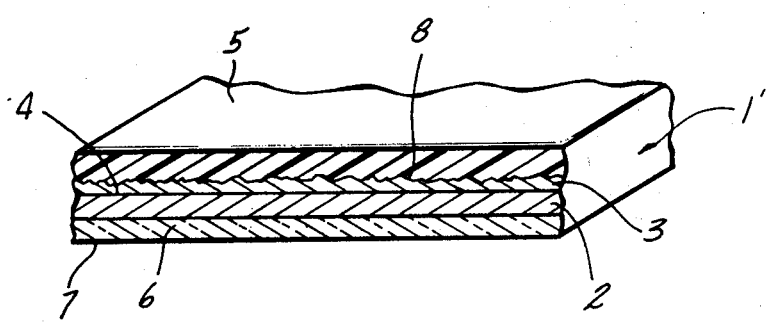
FIG. 2 shows a sectioned perspective view of a composite structure useful in accordance with another embodiment of the instant invention.

FIG. 2 shows a composite 1' in accordance with another embodiment of this invention. The composite 1' is similar to the composite 1 of FIG. 1 in that it includes a metal component 2, a first glass or ceramic component 3 and a heat resistant organic resin 5 component of the same character and type as described with reference to the composite 1 of FIG. 1. The composite of FIG. 2, however, includes a further or second glass or ceramic component 6 bonded to a major surface of the metal component 2 opposed to the resin coated surface 5 of the metal component.

This second glass or ceramic component 6 should preferably have a coefficient of thermal expansion close to that of the metal component 2 and have a softening temperature well above the temperatures to which it will be exposed to in use. Preferably, the second glass or ceramic component 6 should be transparent to allow the aesthetically pleasing appearance of the alloy component 2 to show through, however, it may be translucent or opaque in various colors if desired.

Additions of various compounds to glasses or ceramics are known to cause them to be tinted or colored and, therefore, it is possible to change the color exhibited by the composite surface 7 at the second glass or ceramic component 6 by the addition of such compounds to that glass or ceramic component 6.

These compounds may include but are not limited to $MnO_2$, $Fe_2O_3$, $Cu_2O$, $Co_2O_3$, NiO, $K_2Cr_2O_7$, $Na_2UO_4$, and combinations of these compounds in amounts from 0.1% to about 10% by weight. The use of such additions provides composite 1' surfaces 7 which vary in color depending on the glass or ceramic which is employed and the particular compounds added thereto. It is possible to obtain bronzes, greens, lavenders, blues, etc.

Figure 3:
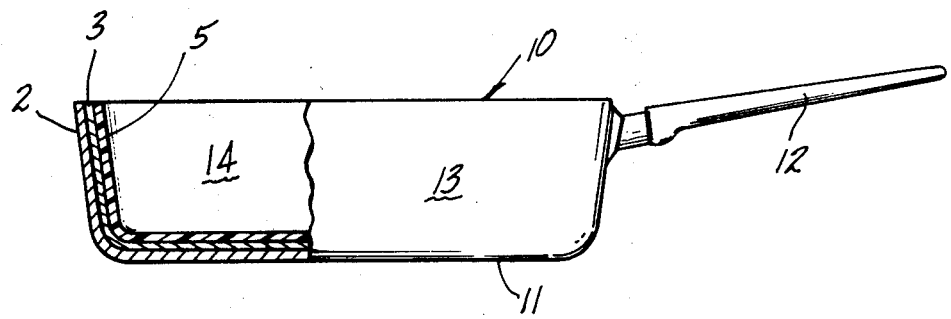
FIG. 3 shows a partially sectioned side view of an exemplary kitchen utensil in accordance with the invention.

The composites 1 and 1' of FIGS. 1 and 2 are uniquely adapted for use in cooking utensils and surfaces exposed to cooking environments. FIG. 3 shows an exemplary cooking utensil 10 employing the composite 1 of FIG. 1. The utensil 10 shown is an ordinary pot having a bowl shaped portion 11 and a handle 12 attached thereto. The structure of the pot, other than the use of the composites 1 and 1' of this invention for the bowl portion 11 is well known in the art and is not meant to be limitive of the invention.

The outside surface 13 of the bowl shaped portion 11 of the pot comprises the metal component 2 of the composite 1 of this invention. The inside surface 14 comprises the heat resistant organic resin component 5.

The pot shown in FIG. 3 is exemplary and the composites 1 and 1' of the instant invention can be employed in a wide variety of cooking utensils 10, including but not limited to pots, pans, griddles, baking pans, cookie sheets, cup cake pans, spatulas, mixing spoons, forks and other implements and the like.

The composites 1 and 1' of the instant invention provide an improved heat resistant organic resin surface 5 having improved scratch resistance and adherence due to the high bond strength of the glass or ceramic component 3 to the metal component 2 of the composites. The bond between the glass or ceramic component 3 and the metal component 2 is an interatomic bond by virtue of the solutionizing effect of the glass or ceramic on the alumina film which is present on the metal component 2.

The glass or ceramic component 3 surface 8 which is to be coated with the heat resistant organic resin component 5 has a considerable roughness since it is formed by firing a frit and, further, since the frit generally does not cover the entire major surface 4 of the metal component 2. Therefore, a good mechanical bond is obtained between the resin component 5 and the glass or ceramic component 3.

The process of forming the composites 1 and 1' of this invention comprises providing an aluminum base alloy component within the aforenoted ranges of composition having first and second major surfaces, the first and second major surfaces being in opposing relationship. The first major surface is then coated with a glass or ceramic frit covering from about 40 to 100% of the surface area of this surface and, preferably, from about 55 to 60%.

The glass or ceramic component is then bonded to the metal component, as by firing in a conventional manner at an appropriate temperature for the specific glass or ceramic involved. The first major surface of the metal component with the bonded glass or ceramic frit is then coated with a heat resistant organic resin followed by curing of the heat resistant organic resin to provide an adherent coating. If desired, the organic resin may be applied in more than one coat.

For example, an air dry primer coat may first be applied followed by the application of the top coating which is then cured. The curing is generally carried out at elevated temperatures. For an organic resin coating of polytetrafluoroethylene, a curing temperature of 800°F has been found to be quite suitable.

When the second glass or ceramic component is desired, it is applied and fired in a conventional manner.

As noted earlier, various tests were conducted to illustrate the improved properties of the alloys employed in the cooking utensils of the present invention. Specifically, the formability of the alloys was compared with that of a well-known, high-temperature, non-magnesium containing aluminum base alloy, namely Alloy 2219, referred to in Table I, of U.S. Pat. No. 3,386,820 to demonstrate that the present alloys possess a formability unexpectedly enhanced thereover. In this test, formability was measured as the linear deformation of a flat surface per unit of force exerted thereon.

Additional tests were conducted to compare the alloys of the invention with well-known cookware Alloy AA 3003, on the bases of strength properties and formability.

The examples following below illustrate the above-noted features of the present invention.

EXAMPLE I

Two samples were prepared comprising the alloy of the present invention and a known high-temperature, magnesium-free aluminum base alloy. Alloy 1 represents the known Alloy AA 2219, and Alloy 2 represents the alloy employed in the present invention. The alloys possessed the nominal compositions set forth in Table II, below.

TABLE II

| AL-LOY | COMPOSITION - WEIGHT PERCENT | | | | | | | | |
|---|---|---|---|---|---|---|---|---|---|
| | Si | Fe | Cu | Mn | Cr | Zr | Zn | Ti | V |
| 1 | 0.06 | 0.12 | 6.3 | 0.3 | — | 0.15 | — | 0.06 | 0.10 |
| 2 | 0.25 | 0.72 | 0.22 | 1.02 | 0.23 | 0.20 | 0.01 | 0.015 | — |

The above alloys were processed into sheet, to the respective thickness of 0.063 inch and 0.040 inch. Each sheet was then divided into several circular blanks for use in the tests that followed.

EXAMPLE II

Samples of Alloys 1 and 2 prepared in Example I at the respective thicknesses, were tested for tensile ductility by the Erichsen Bulge test. The samples were held stationary while a 7/8 inch diameter steel ball was forced into their surface. Both the depth of the impression made by the ball and the maximum force which was employed before the sample fractured were measured and are presented in Table III, below.

TABLE III

| ALLOY | GAUGE | ERICHSEN BULGE TEST | |
|---|---|---|---|
| | | Max. Height (in.) | Max. Load (lbs.) |
| 1 | 0.063 | .415 | 3225 |
|   | 0.040 | .352 | 1825 |
| 2 | 0.063 | .470 | 2625 |
|   | 0.040 | .416 | 1550 |

From the above data, several distinctions may be made. Firstly, on an absolute comparison at each gauge, the alloy of the present invention deformed to a greater extent, and, specifically, Alloy 2 deformed about 13% more than Alloy 1. Further, from the maximum load data, it appears that the greater deformation of Alloy 2 was attained with a smaller expenditure of force. Specifically, at 0.063 inch gauge, Alloy 1 required about 23% greater force to deform than did Alloy 2, and, at 0.040 inch gauge, Alloy 1 exceeded Alloy 2 by about 18%. It can thus be seen that greater deformation at a reduced cost in energy is possible with the alloy employed in the present invention than would be expected of a high temperature, magnesium-free aluminum base alloy of this type, as represented by Alloy 2219. Accordingly, one choosing such an alloy could not merely rely on its properties of thermal stability and minimal magnesium content as indication of its suitability for cookware applications.

In addition to the above analysis, the data in Table III was employed to arrive at a measurable formability expressed in terms of distance of deformation per unit of force exerted. Thus, the maximum height was divided by the maximum load for each sample, the resulting quotients were compared and percentages drawn which were based on the quotients calculated for Alloy 1. The foregoing is set forth in Table IV, below.

TABLE IV

| ALLOY | GAUGE | HEIGHT (in.)/LOAD (lbs.) | ΔF* | ΔF(%) |
|---|---|---|---|---|
| 1 | 0.063 | $12.86 \times 10^{-5}$ | $5.04 \times 10^{-5}$ | 42 |
| 2 | 0.063 | $17.90 \times 10^{-5}$ | | |
| 1 | 0.040 | $26.83 \times 10^{-5}$ | $7.55 \times 10^{-5}$ | 40 |
| 2 | 0.040 | $19.28 \times 10^{-5}$ | | |

*ΔF - Difference in formability expressed as distance of deformation per unit force, between Alloys 1 and 2.

The above table clearly illustrates the significant difference in formability obtained by the use of the alloys of this invention. Prior art Alloy 2219 was surpassed in formability by 40%, and the differential increased at the heavier gauge of materials. The magnitude of difference between the alloys is noteworthy of itself, but bears significantly on the manufacturing feasability of deep drawing operations such as are required for the preparation of kitchen utensils. One skilled in the art would not choose a material whose deformation was limited, as shown for Alloy 1 in Table III, and for which a more limited amount of deformation per unit of force exerted is achieved, as shown in Table IV. In sum, the alloys employed in accordance with the present invention exhibit a level and extent of formability which is unexpected in view of their status as high-temperature, magnesium-free aluminum alloys.

In addition to comparison of the pesent alloys with another high-temperature, magnesium-free aluminum alloy, tests were conducted comparing the present alloys with an aluminum alloy presently employed in cookware manufacture. The tests are presented in the following illustrative examples.

EXAMPLE III

A comparison was made between the alloys of the invention and a conventional cookware alloy. Specifically, Alloy 3 represents a conventional AA 3003 normally used for these composites and Alloys 4 and 5 represented the alloys of the composite of the present invention. The composition of these alloys is shown in Table V below.

TABLE V

COMPOSITION - WEIGHT PERCENT

| ALLOY | Si | Fe | Cu | Mn | Zr | Cr | Al |
|---|---|---|---|---|---|---|---|
| 3 | 0.19 | 0.69 | 0.12 | 1.15 | — | — | essentially balance |
| 4 | 0.27 | 0.64 | 0.20 | 1.0 | 0.20 | 0.25 | essentially balance |
| 5 | 0.10 | 0.25 | 0.10 | 0.50 | 0.20 | 0.25 | essentially balance |

EXAMPLE IV

Alloys 3, 4 and 5 were evaluated for room temperature mechanical properties in the annealed and in the rolled temper. Annealed temper properties were determined upon annealing at 800°F for 1 hour and rolled temper properties were determined upon cold rolling, wih Alloys 3 and 5 rolled 60% and Alloy 4 rolld 35%, all to essentially the same yield strength.

The results are shown in Table VI below in which Alloys 4 and 5 of the composite of the present invention are significantly better than conventional Alloy 3 with respect to the important yield strength in the annealed temper.

TABLE VI

| | ANNEALED TEMPER | | | COLD ROLLED | | |
|---|---|---|---|---|---|---|
| Alloy | UTS, KSI | 0.2% YS,KSI | Elong. % | UTS, KSI | 0.2% YS,KSI | Elong. % |
| 3 | 15.6 | 5.9 | 29 | 28.9 | 25.6 | — |
| 4 | 19.3 | 8.0 | 29 | 29.2 | 26.4 | — |
| 5 | 16.0 | 7.0 | 26 | 29.7 | 27.8 | — |

EXAMPLE V

Alloys 3, 4 and 5 were evaluated for strength at enameling temperature, 1000°F, by hot tensile testing at a slow strain rate. The specimens were tested at 1000°F by applying a load 8 – 10 minutes after reaching temperature. The test duration was approximately 2 minutes. The results are shown in Table VII below in which Alloys 4 and 5 of the composite of the present invention are significantly stronger than conventional Alloy 3.

TABLE VII

| Alloy | Condition | 0.2% Yield Stress, psi at 1000°F |
|---|---|---|
| 3 | Annealed 800°F - 1 hour | 1200 |
| 4 | Annealed 800°F - 1 hour | 1600 |
| 5 | Annealed 800°F - 1 hour | 1700 |

EXAMPLE VI

Alloys 3, 4 and 5 were tested to evaluate dimensional stability on holding at 1000°F by the use of a sag test. The sag test consisted of clamping 8 inch specimens to simulate an unloaded cantilver beam 6 inches long. Deflection of the beam was measured as a deviation from original flat position. The results are shown in Table VIII below. It is quite clear that Alloys 4 and 5 of the composite of the present invention are significantly better than Alloy 3.

TABLE VIII

SAG TEST - 6" LONG CANTILEVERED BEAM - 1000°F - 10 MINUTES

| Alloy | Deflection From Horizontal (inches) |
|---|---|
| 3 | 0.3 |
| 4 | 0.1 |
| 5 | 0.1 |

EXAMPLE VII

Alloys 3, 4 and 5 were evaluated for drawability and earing propensity by test measurements on formed cups of geometry designed to simulate commercial cookware, but of a smaller size. The results are shown in Table IX below and clearly indicate that Alloys 4 and 5 of the composite of the present invention compare quite favorably with Alloy 3.

TABLE IX

EAR HEIGHT

| Alloy | Percent For 0.53 (h/d) Cup |
|---|---|
| 3 | 2.0 |
| 4 | 2.6 |
| 5 | 3.4 |

EXAMPLE X

Alloys 3 and 5 were evaluated for response to coating with polytetrafluoroethylene and endurance of a porcelain enamel coating. Samples of Alloys 3 and 5 were degreased, cleaned, rinsed and dried. The samples were sprayed with Ferro Corporation CN-600-A frit at about 60% coverage followed by spraying with Ferro Corporation frit Al-30 at 2 mils thickness. The Al-30 frit is a pigmented top coat frit. The samples were air dried, heated to 1000°F in 1 hours and fired for 10 minutes. The samples were bent to a 45° angle and immersed in a 5% NH$_4$Cl solution for 96 hours (ASTM C 486-67). The CN-600-A frit adhered well to both Alloys 3 and 5. The Al-30 frit showed no undercutting with respect to Alloy 5, but had pinholes with respect to Alloy 3.

A coating of polytetrafluoroethylene (0.8 – 1.0 mil thick) was applied over both samples on top of the frit by baking for 20 minutes at 800°F. Both samples were found to be highly resistant to peeling and scratching.

It is to be understood that this invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within its spirit and scope as defined by the claims.

What is claimed is:

1. A cooking utensil shaped by a process involving metal deformation from a composite, said composite comprising a high-temperature, substantially magnesium-free aluminum base alloy component exhibiting improved formability, said aluminum base alloy component comprising from about 0.1–0.7% zirconium, 0.1–0.4% chromium, 0.3–1.5% manganese and the balance essentially aluminum and having at least a first and second major surface, said second major surface being in opposing relationship to said first major surface; an oxide layer formed over substantially all of said first major surface, said oxide layer comprised of alumina and having a thickness of at least 50 Angstroms; a glass or ceramic component comprising a coating of a glass or ceramic frit covering from about 40 to 100% of the surface area of said first major surface, said glass or ceramic component being bonded to said aluminum base alloy component in a glass or ceramic-to-metal bond involving said oxide layer; and a heat resistant organic resin coating over said glass or ceramic component and said first major surface of said aluminum base alloy component, said heat resistant organic resin component comprising a cooking surface.

2. A cooking utensil as in claim 1 wherein said aluminum base alloy component contains up to 0.7% iron, up to 0.5% silicon, up to 0.5% copper, others, each up to 0.1%, total up to 0.25%.

3. A cooking utensil as in claim 1 wherein said heat resistant organic resin is a polyimide, a polymer of a halogenated ethylene or a halogenated propylene or a silicone.

4. A cooking utensil as in claim 1 wherein said aluminum base alloy consists essentially of 0.2 to 0.4% zirconium, 0.2 to 0.3% chromium, 0.5 to 1.3% manganese, balance essentially aluminum.

5. A cooking utensil as in claim 1 wherein said heat resistant organic resin comprises polytetrafluoroethylene.

6. A cooking utensil as in claim 1 further including a glass or ceramic component bonded to said second major surface of said aluminum base alloy component.

7. A cooking utensil as in claim 1 wherein formability is defined herein as the distance said alloy is deformed per unit of deforming force exerted thereon, and said alloy exceeds by at least about 40% the formability of comparable aluminum base alloys.

* * * * *